(12) United States Patent
Haruta et al.

(10) Patent No.: US 12,030,585 B2
(45) Date of Patent: Jul. 9, 2024

(54) BRAKE MASTER CYLINDER AND STRADDLED VEHICLE INCLUDING SAME

(71) Applicant: YAMAHA HATSUDOKI KABUSHIKI KAISHA, Iwata (JP)

(72) Inventors: Katsuya Haruta, Shizuoka (JP); Kazuki Watanabe, Shizuoka (JP); Norihisa Kobayashi, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/695,616

(22) Filed: Mar. 15, 2022

(65) Prior Publication Data
US 2022/0297791 A1 Sep. 22, 2022

(30) Foreign Application Priority Data
Mar. 16, 2021 (JP) .................. 2021-042809

(51) Int. Cl.
*B60T 17/04* (2006.01)
*B60T 11/22* (2006.01)
*B62L 3/04* (2006.01)

(52) U.S. Cl.
CPC .............. *B62L 3/04* (2013.01); *B60T 11/22* (2013.01); *B60T 17/04* (2013.01)

(58) Field of Classification Search
CPC ........... B60T 17/04; B60T 17/06; B60T 11/22
See application file for complete search history.

(56) References Cited

U.S. PATENT DOCUMENTS

| 6,336,328 B1 | 1/2002 | Inami et al. |
| 2022/0032895 A1 * | 2/2022 | Barnett .................... B60T 11/22 |

FOREIGN PATENT DOCUMENTS

| DE | 102009006452 A1 * | 7/2010 | .............. B60T 11/22 |
| JP | 2000-255409 A | 9/2000 | |
| JP | 2004-042766 A | 2/2004 | |
| JP | 2004-359202 A | 12/2004 | |

* cited by examiner

*Primary Examiner* — Kenneth Bomberg
*Assistant Examiner* — Daniel S Collins
(74) *Attorney, Agent, or Firm* — Rabin & Berdo, P.C.

(57) ABSTRACT

A master cylinder for a brake. The master cylinder includes a cylinder main body having a hydraulic pressure chamber, a reservoir tank having a storage chamber, and a separator that is provided in the reservoir tank to divide a space in the storage chamber of the reservoir tank into an upper region and a lower region. A hydraulic fluid is storable in the hydraulic pressure chamber, and is storable in the storage chamber for thereby replenishing the hydraulic pressure chamber. The hydraulic fluid is circulatable between the upper region and the lower region, such that a liquid surface of the hydraulic fluid is in the upper region. The separator has a lower surface in the lower region. The lower surface has an inner portion, and an inclined portion that surrounds the inner portion and that is inclined outwardly and upwardly with respect to the inner portion.

8 Claims, 10 Drawing Sheets

F I G. 7
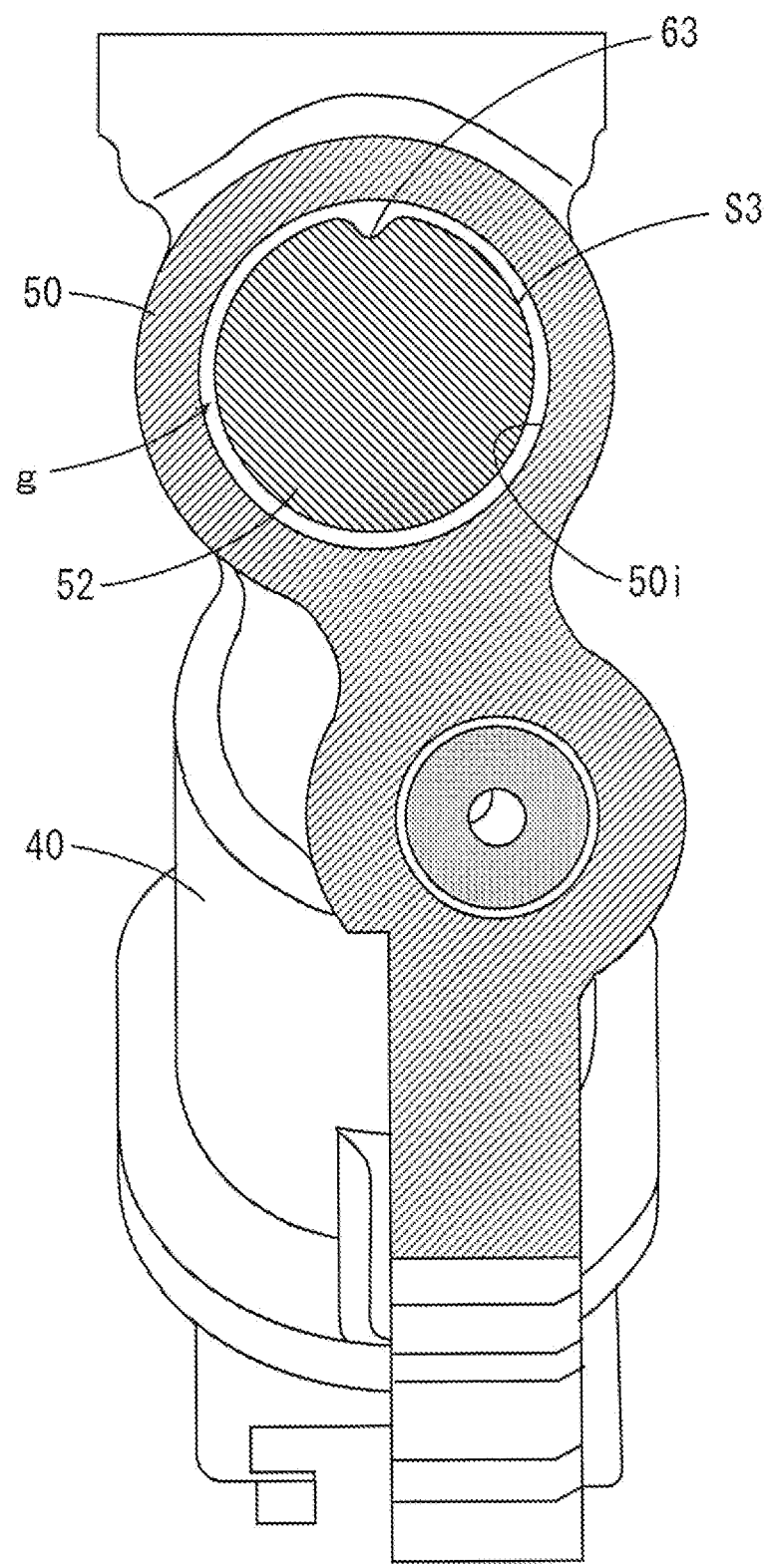

BRAKE MASTER CYLINDER AND STRADDLED VEHICLE INCLUDING SAME

CROSS-REFERENCE TO RELATED APPLICATIONS

This application is based upon and claims the benefit of priority of the prior Japanese Patent Application No. 2021-042809, filed on Mar. 16, 2021, the entire contents of which are incorporated herein by reference.

BACKGROUND

Technical Field

The present invention relates to a brake master cylinder and a straddled vehicle including the brake master cylinder.

Description of Related Art

In a motorcycle, a master cylinder is used to supply a hydraulic pressure of a hydraulic fluid to a caliper that supplies a braking force to a wheel. For example, the brake master cylinder described in JP 2000-255409 A includes a master cylinder main body that generates a pressure of a brake hydraulic fluid and a sub-tank (reservoir tank) for supplying the hydraulic fluid.

In a cylinder chamber of the master cylinder main body, a piston that reciprocates in accordance with a rider's operation of a brake petal is provided. A cylindrical hydraulic fluid storage chamber that stores a hydraulic fluid is formed in the sub-tank. The master cylinder main body and the sub-tank are integrally formed with a partition wall provided therebetween. In the partition wall, two ports that causes the space in the cylinder chamber of the master cylinder main body and the space in the hydraulic fluid storage chamber of the sub-tank to communicate with each other are formed.

A diaphragm is provided in the hydraulic fluid storage chamber of the sub-tank. The lower end of the diaphragm is located farther upwardly of the above-mentioned two ports. When the piston reciprocates in the cylinder chamber, the hydraulic fluid circulates between the cylinder chamber and the hydraulic fluid storage chamber through the two ports.

Bubbles must not enter the cylinder chamber. As such, in the above-mentioned sub-tank described in JP 2000-255409 A, an oil separator is integrally formed at the lower end of the diaphragm. The oil separator has a substantially disc shape. Further, semi-circular small-hole passages are formed at the outer peripheral surface of the oil separator at equal intervals in the circumferential direction.

In the sub-tank, the hydraulic fluid is stored in the hydraulic fluid storage chamber such that the liquid surface of the hydraulic fluid is located farther upwardly of the oil separator. Thus, even in a case in which bubbles are generated on the liquid surface of the hydraulic fluid due to vibration transmitted during traveling of the vehicle, entrance of the generated bubbles to a region lower than the oil separator is reduced. Therefore, bubbles generated on the liquid surface of the hydraulic fluid are prevented from entering the cylinder chamber from the hydraulic fluid storage chamber through the two ports.

SUMMARY

It is desirable that an amount of bubbles present in a region lower than the oil separator in the sub-tank (the lower region of the reservoir tank) is reduced in order to enhance credibility in regard to prevention of entrance of bubbles to the cylinder chamber.

An object of the present invention is to provide a brake master cylinder and a straddled vehicle including the brake master cylinder that enables a reduction in amount of bubbles present in a lower region of a reservoir tank.

(1) A brake master cylinder according to one aspect of the present invention includes a cylinder main body having a hydraulic pressure chamber that stores a hydraulic fluid, a reservoir tank having a storage chamber that stores a hydraulic fluid to be replenished in the hydraulic pressure chamber, and a separator that is provided in the reservoir tank to divide a space in the storage chamber of the reservoir tank into an upper region and a lower region, and is provided in the reservoir tank such that a hydraulic fluid is circulatable between the upper region and the lower region and a liquid surface of the hydraulic fluid is formed in the upper region, wherein the separator has a lower surface in the lower region, and at least part of an annular portion including an outer peripheral end portion of the lower surface of the separator is formed to be inclined outwardly and upwardly as an inclined portion.

In the brake master cylinder, the separator is provided to section the space in the storage chamber in the reservoir tank into the upper region and the lower region. The inclined portion of the lower surface of the separator is formed to be inclined outwardly and upwardly. Thus, even in a case in which bubbles generated in the upper region of the space of the storage chamber enter the lower region, bubbles that have entered the lower region are guided smoothly to the upper region along the inclined portion of the lower surface of the separator. As a result, an amount of bubbles present in the lower region of the reservoir tank can be reduced.

(2) The reservoir tank may have an inner peripheral surface that surrounds a space in the storage chamber and extends linearly in a first direction directed from the lower region toward the upper region, the separator may have an outer peripheral surface that extends linearly from an upper end of the lower region to a lower end of the upper region along the inner peripheral surface of the reservoir tank, and a hydraulic flow passage that enables circulation of a hydraulic fluid between the upper region and the lower region and suppresses circulation of bubbles may be formed between the inner peripheral surface of the reservoir tank and the outer peripheral surface of the separator.

With the above-mentioned configuration, entrance of bubbles that are generated in the upper region to the lower region can be reduced with a simple configuration.

(3) A length of the outer peripheral surface of the separator may be larger than a length of the inclined portion of the lower surface of the separator in the first direction.

In this case, as compared to a case in which the length of the outer peripheral surface of the separator is equal to or smaller than the length of the inclined portion of the lower surface of the separator, the length of the hydraulic flow passage can be increased. This enables suppression of entrance of bubbles generated in the upper region to the lower region with a simple configuration.

(4) The annular portion of the lower surface of the separator may be formed to be inclined outwardly and upwardly in an entire circumference and extend to a lower end portion of the outer peripheral surface.

In this case, because the annular portion of the lower surface of the separator is inclined in the entire circumference, bubbles that have entered the lower region flow smoothly along the annular portion to the lower end portion of the outer peripheral surface and are guided smoothly to the upper region. Therefore, because remaining of bubbles in the lower region is more sufficiently suppressed, an amount of bubbles present in the lower region of the reservoir tank can be more sufficiently reduced.

(5) A minimum length of the outer peripheral surface of the separator in the first direction may be equal to or larger than ⅓ of a maximum dimension of the separator in a second direction that orthogonally intersects with the first direction.

In this case, as compared to a case in which the minimum length of the outer peripheral surface of the separator in the first direction is smaller than ⅓ of the maximum dimension of the separator in the second direction that orthogonally intersects with the first direction, the length of the hydraulic flow passage can be increased. Thus, with a simple configuration, entrance of bubbles generated in the upper region to the lower region can be suppressed more sufficiently.

(6) The hydraulic flow passage may include a groove that extends in the first direction in the outer peripheral surface of the separator.

In this case, even in a case in which the hydraulic fluid does not circulate between the upper region and the lower region, bubbles that enter the lower region are smoothly guided to the upper region through the space in the groove of the outer peripheral surface of the separator. Thus, because bubbles are prevented from remaining in the lower region for a long period of time, an amount of bubbles present in the lower region of the reservoir tank can be further reduced.

(7) The separator may be formed of a solid material. In this case, rigidity of the separator can be enhanced as compared to a case in which the separator is formed of a hollow material. Therefore, in a case in which the hydraulic fluid circulates between the upper region and the lower region, the separator is prevented from being deformed due to the circulation. As a result, entrance of a large amount of bubbles from the upper region to the lower region due to the deformation of the separator is suppressed.

(8) A straddled vehicle according to another aspect of the present invention includes a vehicle main body, a wheel rotatably provided at the vehicle main body, and the above-mentioned brake master cylinder connected to a caliper that supplies a braking force to the wheel.

The straddled vehicle includes the above-mentioned brake master cylinder. This enables a reduction in amount of bubbles present in the lower region of the reservoir tank regardless of the state of vibration of the straddled vehicle.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 7 is a cross sectional view of the master cylinder of FIG. 4 taken along the line Q-Q;

DETAILED DESCRIPTION

A brake master cylinder and a straddled vehicle including the brake master cylinder according to one embodiment of the present invention will be described below with reference to the drawings. A motorcycle will be described as one example of the straddled vehicle.

[1] Schematic Configuration of Motorcycle

Figure 1:
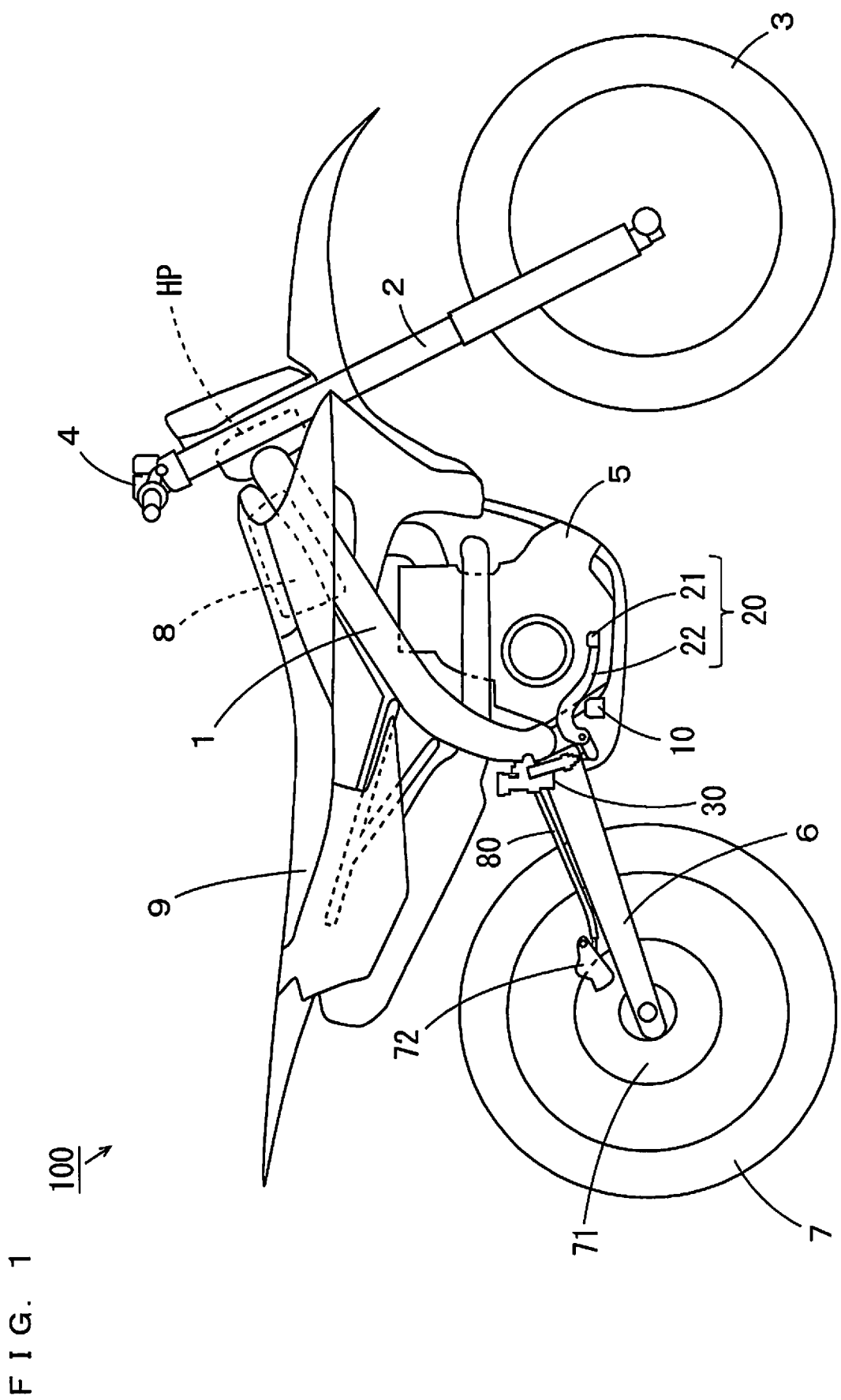
FIG. 1 is a right side view of a motorcycle according to one embodiment of the present invention.

FIG. 1 is a right side view of the motorcycle according to the one embodiment of the present invention. In FIG. 1, the motorcycle 100 standing up to be perpendicular to the road surface is shown. The motorcycle 100 of FIG. 1 includes a metallic body frame 1. The body frame 1 includes a head pipe HP and a plurality of frame members. The head pipe HP is located in a front portion of the vehicle, and the plurality of frame members are provided to extend toward a rear portion of the vehicle from the head pipe HP.

A front fork 2 is provided at the head pipe HP to be swingable in a left-and-right direction. A front wheel 3 is rotatably supported at the lower end of the front fork 2. A handle 4 is provided at the upper end of the front fork 2.

The body frame 1 supports an engine 5, a fuel tank 8 and a seat 9. In this state, the engine 5 is located at a position farther downward than the head pipe HP. Further, the fuel tank 8 is located at a position farther upward than the engine 5 and farther rearward than the head pipe HP. Further, the seat 9 is located at a position farther rearward than the fuel tank 8.

In a substantially center portion of the motorcycle 100 in a front-and-rear direction, a rear arm 6 is provided to extend rearwardly from a lower portion of the body frame 1. The rear arm 6 is supported at the body frame 1 with use of a pivot shaft (not shown). A rear wheel 7 and a disc rotor 71 are rotatably supported at the rear end of the rear arm 6. The rear wheel 7 is rotated as a drive wheel by the motive power generated from the engine 5. The disc rotor 71 is integrally provided with the rear wheel 7, and is rotated together with the rear wheel 7 when the rear wheel 7 is rotated.

A brake caliper 72 is further attached to the rear arm 6. The brake caliper 72 includes a brake pad (not shown) configured to be capable of pressing the disc rotor 71. One end of a brake hose 80 extending from the master cylinder 30, described below, is connected to the brake caliper 72.

Further, in the substantially center portion of the motorcycle 100 in the front-and-rear direction, a pair of left and right footrests 10, a brake link mechanism 20 and the master cylinder 30 are provided in a portion in the vicinity of the lower end portion of the body frame 1. In FIG. 1, only a footrest 10 for a rider's right foot of the pair of left and right footrests 10 is shown. A footrest for a rider's left foot is provided at a position symmetrical with the footrest 10 of FIG. 1 with a vertical plane extending in the vehicle front-and-rear direction through the center of the vehicle as a basis.

The brake link mechanism 20 is provided in a right side portion of the motorcycle 100 and includes a brake pedal 21 and a pedal lever 22. The pedal lever 22 extends in the vehicle front-and-rear direction through a position in the vicinity of the right footrest 10. Part of the pedal lever 22 except for end portions (a front end portion and a rear end portion) is rotatably supported at a support shaft (not shown) extending horizontally and rightwardly from the body frame 1. The brake pedal 21 is attached to the front end portion of the pedal lever 22 to be located at a position farther forward than the right footrest 10. A rider of the motorcycle 100 can stamp on the brake pedal 21 (hereinafter referred to as a rear-wheel brake operation) while placing his or her right foot on the right footrest 10.

The master cylinder 30 is fixed to the body frame 1. In this state, the master cylinder 30 is located above the rear end portion of the pedal lever 22 in the right side portion of the motorcycle 100. Further, the other end of the brake hose 80 is connected to the master cylinder 30. Details of the master cylinder 30 will be described.

[2] Details of Master Cylinder 30

Figure 2:
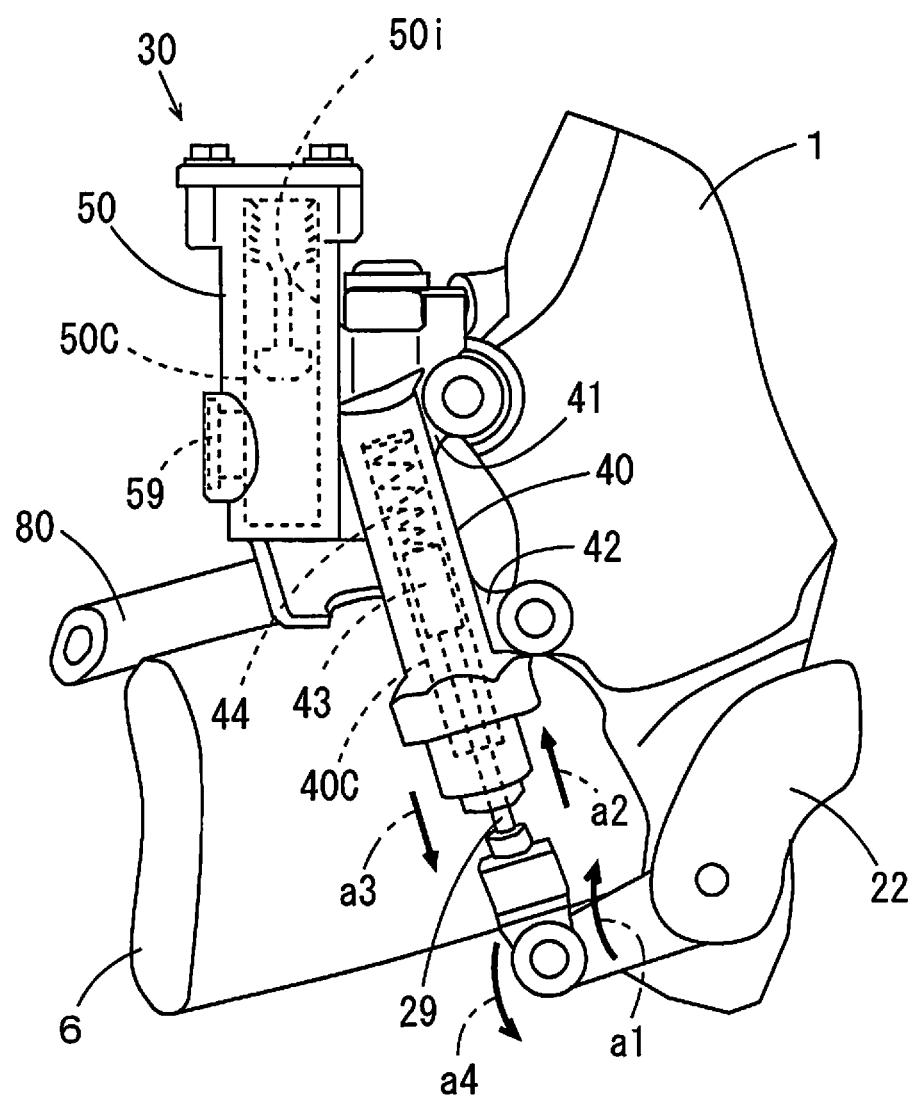
FIG. 2 is a right side view of a master cylinder of FIG. 1 and its peripheral members.
Figure 3:
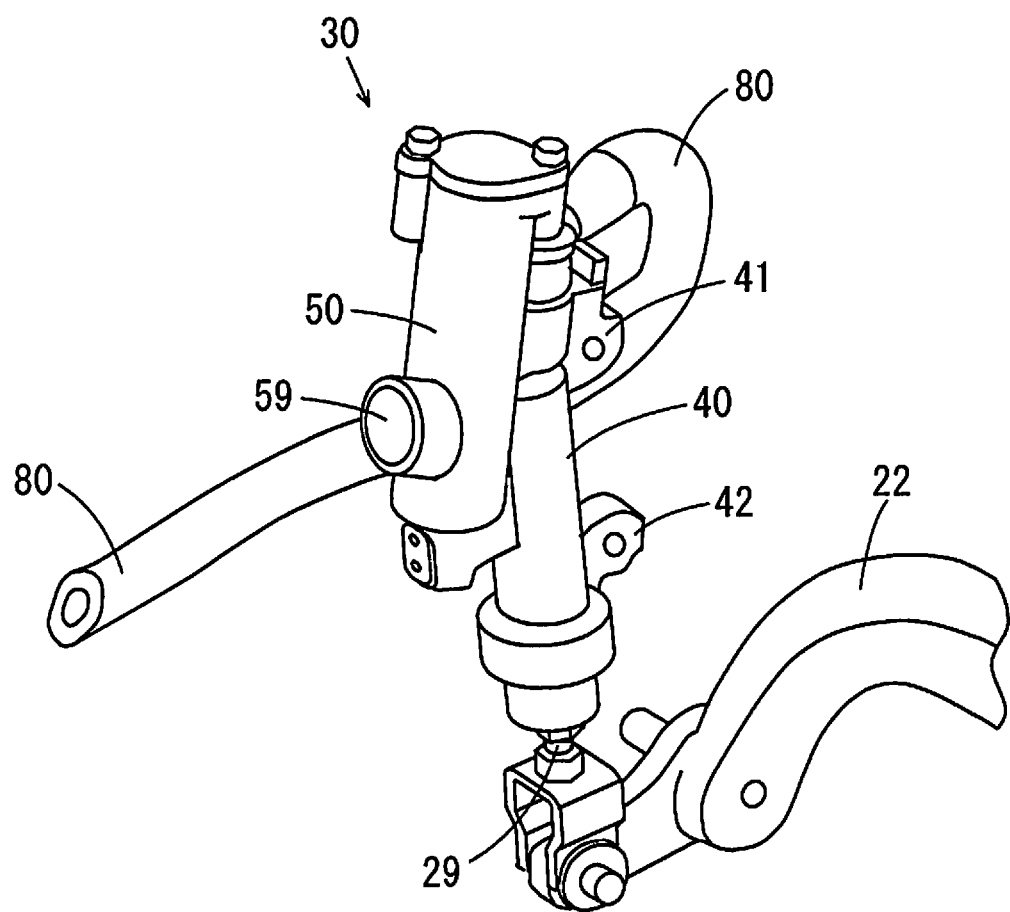
FIG. 3 is an external perspective view of the master cylinder and its peripheral members when the motorcycle of FIG. 1 is viewed from a position farther rightward and rearward of the motorcycle.

FIG. 2 is a right side view of the master cylinder 30 of FIG. 1 and its peripheral members, and FIG. 3 is an external perspective view of the master cylinder 30 and its peripheral members when the motorcycle 100 of FIG. 1 is viewed from a position obliquely farther rightward and rearward than the motorcycle 100. In FIG. 2, as the peripheral members of the master cylinder 30, parts of the body frame 1, the rear arm 6, the pedal lever 22 and the brake hose 80 are shown. Further, in FIG. 3, as the peripheral members of the master cylinder 30, a part of the pedal lever 22 and a part of the brake hose 80 are shown.

As shown in FIG. 2, the master cylinder 30 includes a cylinder main body 40 and a reservoir tank 50. The cylinder main body 40 and the reservoir tank 50 are respectively and substantially cylindrical and integrally formed to be adjacent to each other. In an up-and-down direction of the master cylinder 30, the cylinder main body 40 is formed to extend obliquely from a substantially center portion of the outer peripheral surface of the reservoir tank 50 to a position farther downward than the lower end portion of the reservoir tank 50.

Two attachment portions 41, 42 are provided at the outer periphery of the cylinder main body 40 to project in a direction away from the reservoir tank 50. The attachment portions 41, 42 are attached to the body frame 1 with use of screws. Thus, the master cylinder 30 is fixed to the body frame 1.

A hydraulic pressure chamber 40C is formed in the cylinder main body 40. The hydraulic pressure chamber 40C extends in a direction in which the cylinder main body 40 extends. In the hydraulic pressure chamber 40C, a piston 43 and a return spring 44 are contained. The piston 43 is provided to be reciprocatable in the hydraulic pressure chamber 40C. Further, the return spring 44 biases the piston downwardly using a predetermined elastic force. In the inner space of the hydraulic pressure chamber 40C, a hydraulic fluid (brake fluid) for driving the brake caliper 72 is stored above the piston 43.

A pushrod 29 is inserted into the lower end portion of the cylinder main body 40. The upper end portion of the pushrod 29 is connected to the piston 43 in the hydraulic pressure chamber 40C. The lower end portion of the pushrod 29 is connected to the pedal lever 22.

When the rider performs the rear-wheel brake operation, the pedal lever 22 is rotated about the support shaft (not shown), and the rear end portion of the pedal lever 22 is lifted as indicated by the arrow a1 in FIG. 2. In this case, as indicated by the arrow a2 in FIG. 2, the pushrod 29 is pushed into the cylinder main body 40, and the piston 43 is lifted. Thus, the hydraulic fluid in the hydraulic pressure chamber 40C is pressurized. The pressure (hydraulic pressure) of the hydraulic fluid generated by the rear-wheel brake operation is supplied to the brake caliper 72 from the master cylinder 30 through the brake hose 80. In the brake caliper 72, the brake pad presses the disc rotor 71 with a pressing force corresponding to the supplied hydraulic pressure. Thus, a braking force is supplied to the rear wheel 7.

At the end of the rear-wheel brake operation, stamping of the brake pedal 21 by the rider is released. In this case, in the hydraulic pressure chamber 40C, the piston 43 is lowered by an elastic force of the return spring 44, and the pushrod 29 is pushed out of the cylinder main body 40 as indicated by the arrow a3 in FIG. 2. Thus, as indicated by the arrow a4 in FIG. 2, the rear end portion of the pedal lever 22 is lowered.

A storage chamber 50C for storing the hydraulic fluid is formed in the reservoir tank 50. The reservoir tank 50 has a cylindrical inner peripheral surface 50i that surrounds the inner space of the storage chamber 50C and extends linearly toward a lower portion of the reservoir tank 50 from a position in the vicinity of the upper end portion of the reservoir tank 50. In the following description, the direction directed from below to above along the center axis of the reservoir tank 50 (the center axis of the storage chamber 50C) is referred to as a reservoir direction. The master cylinder 30 is fixed to the body frame 1 such that the reservoir direction is substantially vertical to the road surface when the vehicle is traveling straight ahead. Further, the reservoir tank 50 is configured to be capable of replenishing the hydraulic pressure chamber 40C with the hydraulic fluid in the storage chamber 50C and collecting the hydraulic fluid in the hydraulic pressure chamber 40C.

As shown in FIG. 3, a window portion 59 for checking an amount of the hydraulic fluid in the storage chamber 50C from outside of the master cylinder 30 is provided in part of the outer peripheral surface of the reservoir tank 50. The window portion 59 is constituted by a transparent member such as glass.

Figure 4:
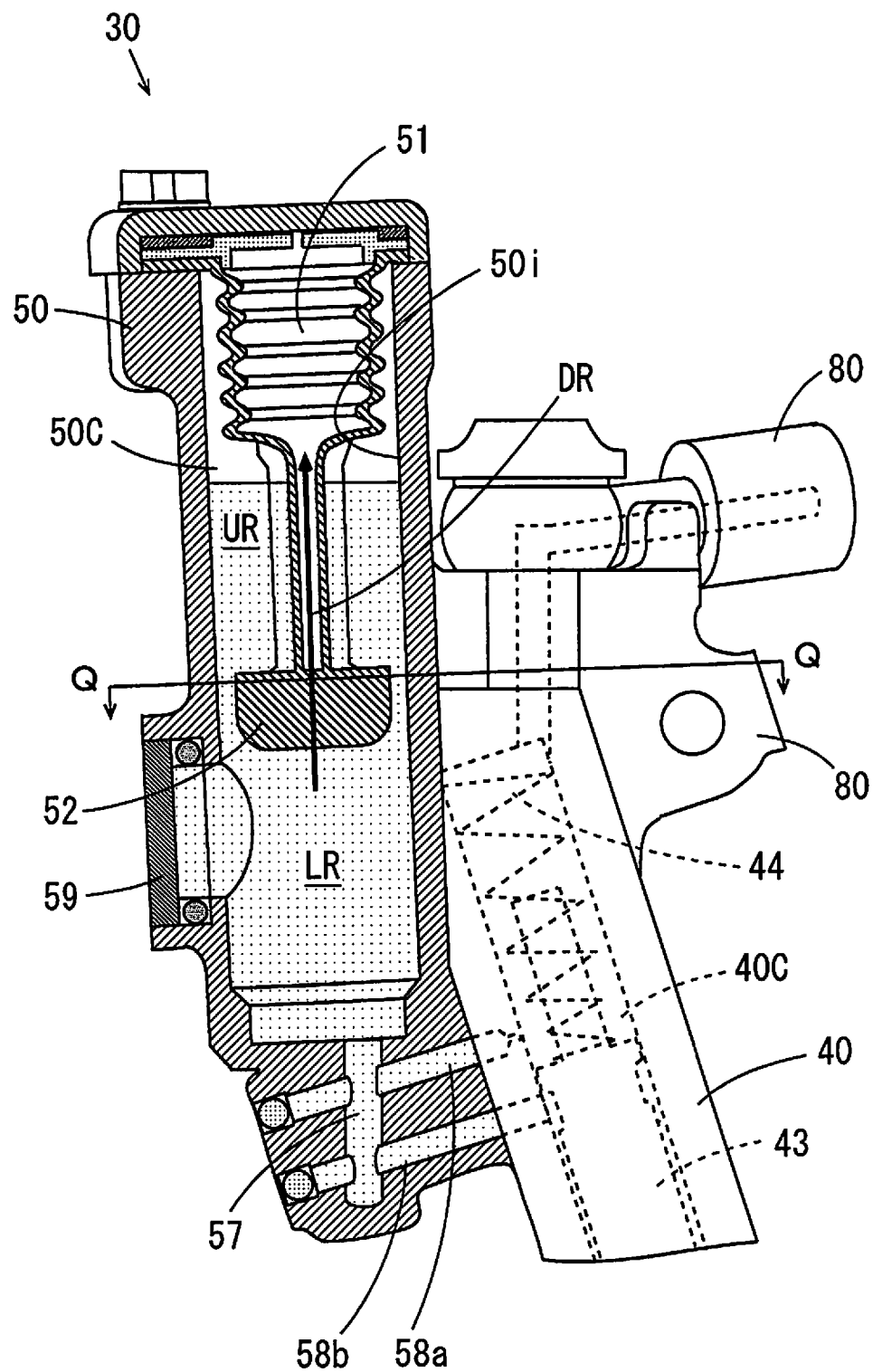
FIG. 4 is a partially enlarged right side view of the master cylinder of FIG. 3.

FIG. 4 is a partially enlarged right side view of the master cylinder 30 of FIG. 3. In FIG. 4, part of the reservoir tank 50 of the master cylinder 30 is shown in a longitudinal cross sectional view. Further, the reservoir direction is indicated by the arrow DR. Further, in FIG. 4 and FIG. 9, described below, the hydraulic fluid is indicated by the dotted pattern.

As shown in FIG. 4, in a lower portion of the reservoir tank 50, a liquid through hole 57 is formed to extend downwardly from a bottom portion of the storage chamber 50C. Further, in the lower portion of the reservoir tank 50, two ports 58a, 58b that cause the inner space of the liquid through hole 57 to communicate with the inner space of the hydraulic pressure chamber 40C of the cylinder main body 40 are formed. Thus, when the piston 43 in the cylinder main body 40 operates, the hydraulic fluid circulates between the hydraulic pressure chamber 40C and the storage chamber 50C through the liquid through hole 57 and the ports 58a, 58b.

In the storage chamber 50C, a diaphragm 51 is provided to extend from the upper end portion of the reservoir tank 50 to a substantially center portion of the storage chamber 50C. A separator 52 is provided at the lower end portion of the diaphragm 51. In the present embodiment, the diaphragm 51 and the separator 52 are constituted by a single member integrally formed of a common material. For example, rubber is used a material for the diaphragm 51 and the separator 52.

The separator 52 sections the inner space in the storage chamber 50C into an upper region UR and a lower region LR. Further, the separator 52 is configured such that the hydraulic fluid can circulate between the upper region UR and the lower region LR while the hydraulic fluid is stored in the storage chamber 50C with the liquid surface located in the upper region UR.

Depending on a state of vibration transmitted from the body frame 1 to the master cylinder 30 during traveling of the vehicle, bubbles may be generated in the hydraulic fluid due to a large change of the liquid surface of the hydraulic fluid in the reservoir tank 50. As described in Background Art, bubbles must not enter the hydraulic pressure chamber 40C of the cylinder main body 40. It is desirable that an amount of bubbles present in the lower region LR of the reservoir tank 50 is reduced in order to enhance credibility in regard to prevention of entrance of bubbles to the hydraulic pressure chamber 40C of the cylinder main body 40. As such, in the master cylinder 30 according to the present embodiment, the structure of the separator 52 has been devised such that an amount of bubbles present in the lower region LR can be reduced. The structure of the separator 52 will be described below.

[3] Structure of Separator 52

Figure 5:
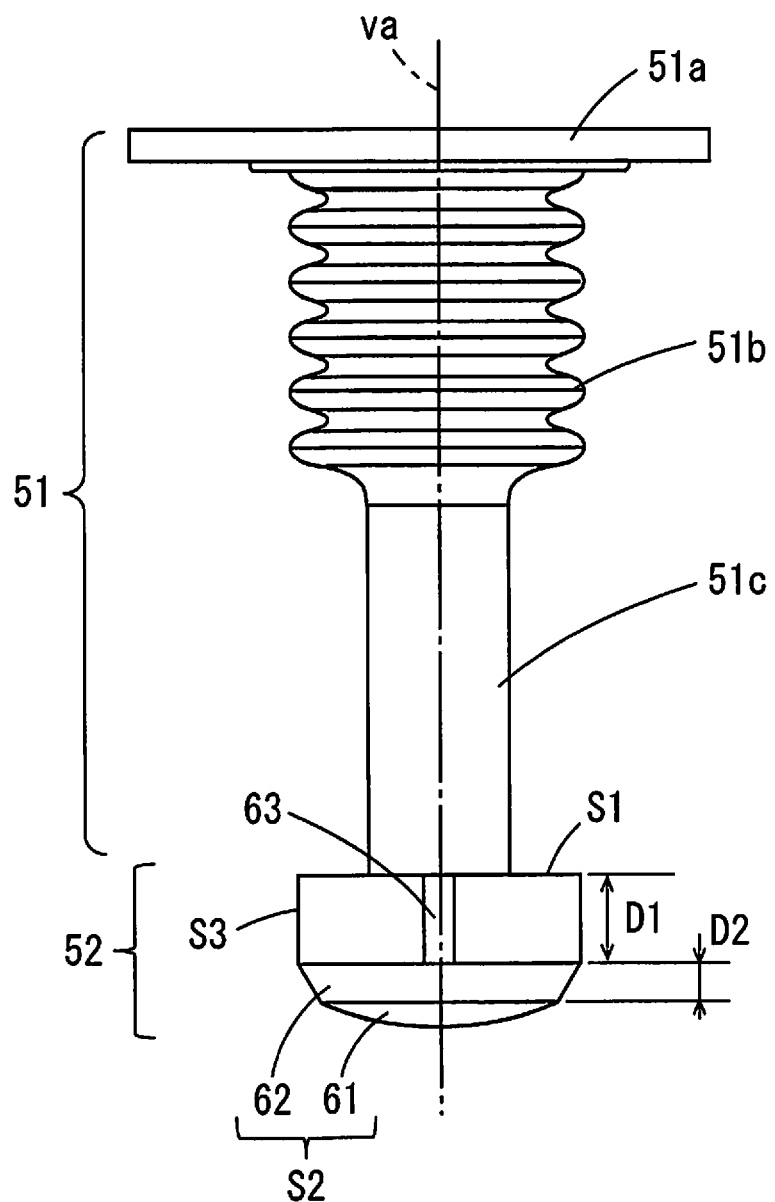
FIG. 5 is a side view of an integrally formed article of a diaphragm and a separator.
Figure 6:
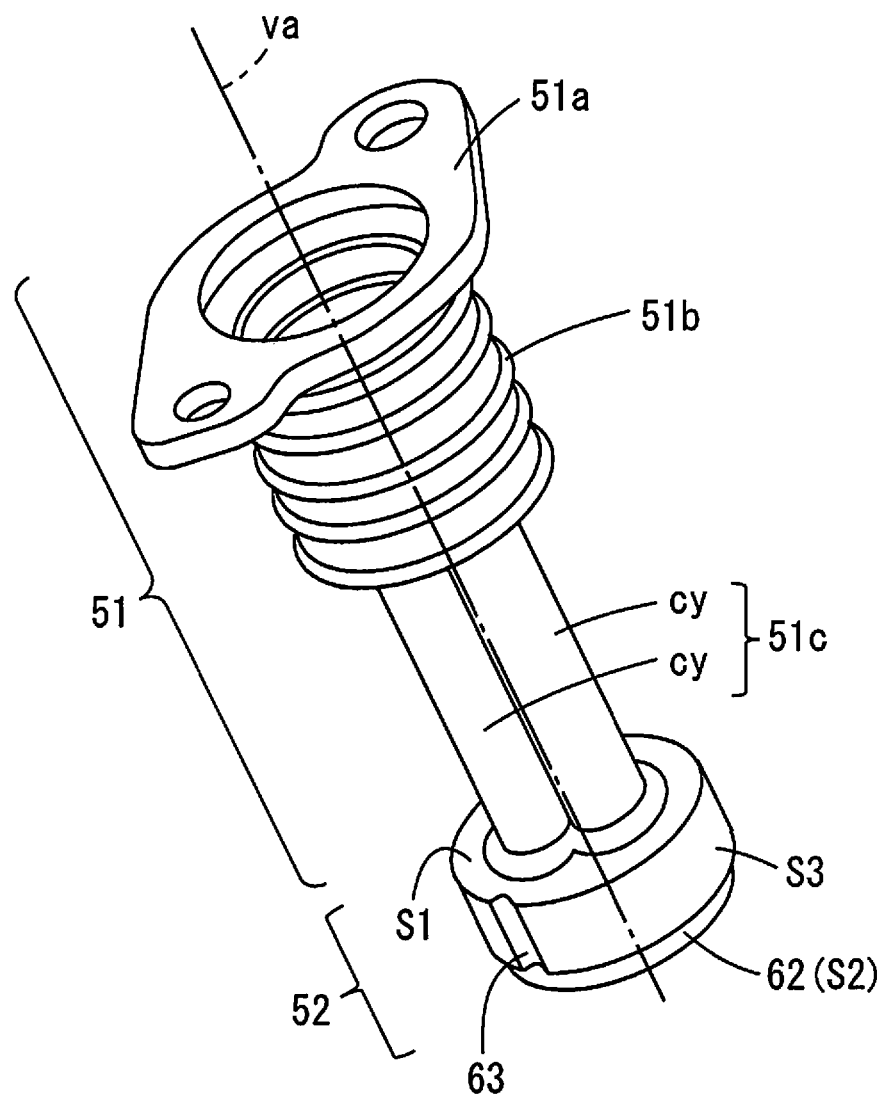
FIG. 6 is an external perspective view of the integrally formed article of the diaphragm and the separator.

FIG. 5 is a side view of an integrally molded article of the diaphragm 51 and the separator 52. FIG. 6 is an external perspective view of the integrally molded article of the diaphragm 51 and the separator 52. In the integrally molded article of FIGS. 5 and 6, in a case in which the integrally molded article is provided in the reservoir tank 50, a virtual center axis va that coincides or substantially coincides with the center axis of the reservoir tank 50 is defined.

As shown in FIGS. 5 and 6, the diaphragm 51 has a first elastic portion 51b and a second elastic portion 51c. The first elastic portion 51b and the second elastic portion 51c are continuously arranged in this order from above to below. The first elastic portion 51b has a cylindrical shape surrounding the virtual center axis va and extending in a bellow shape and is formed to be extendable and contractible in the direction of the virtual center axis va. The inner space of the first elastic portion 51b is opened upwardly. An attachment portion 51a is provided at the upper end portion of the first elastic portion 51b. The attachment portion 51a is formed to have a flange shape that extends radially in a plane orthogonally intersecting with the virtual center axis va from the upper end portion of the first elastic portion 51b. The attachment portion 51a is fixed to the upper end portion of the storage chamber 50c in the reservoir tank 50 when the master cylinder 30 is assembled.

As shown in FIG. 6, the second elastic portion 51c has the configuration in which a plurality (two in the present example) of cylindrical portions cy are combined. Each cylindrical portion cy extends linearly in the direction of the virtual center axis va and is formed to be extendable and contractible in the direction orthogonally intersecting with the virtual center axis va. Further, in the upper end portion of each cylindrical portion cy, the inner space of the cylindrical portion cy is opened upwardly through the inner space of the first elastic portion 51b. On the other hand, in the lower end portion of each cylindrical portion cy, the inner space of the cylindrical portion cy is closed by the separator 52.

The diaphragm 51 having the above-mentioned configuration is deformed such that the pressure in the storage chamber 50C is maintained at an atmospheric pressure when an amount of the hydraulic fluid stored in the reservoir tank 50 changes.

The separator 52 is formed of a solid material that does not include a substantive void (a solid rubber material in the present example) (see FIG. 4). Further, as shown in FIGS. 5 and 6, the separator 52 has an outer shape that is substantially rotationally symmetrical with respect to the virtual center axis va. Specifically, the separator 52 according to the present embodiment has an upper surface S1, a lower surface S2 and an outer peripheral surface S3. The upper surface S1 is a surface directed toward the upper region UR with the separator 52 provided in the reservoir tank 50, and is formed flat except for a portion coupled to the diaphragm 51. The lower surface S2 is a surface directed toward the lower region LR with the separator 52 provided in the reservoir tank 50. Details of the lower surface S2 will be described below.

The outer peripheral surface S3 is a surface facing the inner peripheral surface 50i of the reservoir tank 50 with the separator 52 provided in the reservoir tank 50. In other words, the outer peripheral surface S3 is a surface extending linearly from the upper end of the lower region LR to the lower end portion of the upper region UR along the inner peripheral surface 50i of the reservoir tank 50. A groove 63 is formed in part of the outer peripheral surface S3 to extend in parallel with the virtual center axis va.

FIG. 7 is a cross sectional view taken along the line Q-Q of the master cylinder 30 of FIG. 4. The cross section of the master cylinder 30 of FIG. 7 orthogonally intersects with the reservoir direction DR (FIG. 4). As shown in FIG. 7, in regard to the separator 52 according to the present embodiment, a cross section orthogonally intersecting with the reservoir direction DR has a substantially circular shape with the separator 52 attached to the reservoir tank 50. The outer diameter of the outer peripheral surface S3 is set smaller than the inner diameter of the inner peripheral surface 50i of the reservoir tank 50 by a certain length. Thus, a gap g is formed along the entire circumference between the outer peripheral surface S3 of the separator 52 and the inner peripheral surface 50i of the reservoir tank 50. This gap g enables circulation of the hydraulic fluid between the upper region UR and the lower region LR.

Further, as described above, the groove 63 is formed in part of the outer peripheral surface S3 of the separator 52. Of the gap g between the outer peripheral surface S3 and the inner peripheral surface 50i, the gap portion of the gap g located between the groove 63 and the inner peripheral surface 50i is larger than the rest of the gap portion of the gap g. Therefore, in the gap portion of the gap g located between the groove 63 and the inner peripheral surface 50i, the hydraulic fluid smoothly circulates between the upper region UR and the lower region LR as compared to the rest of the gap portion of the gap g.

Figure 8:
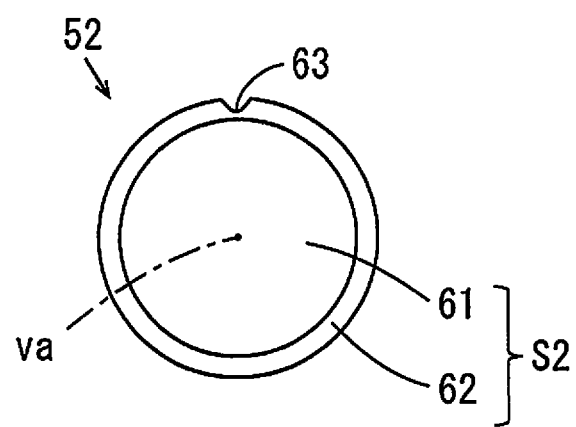
FIG. 8 is a bottom view of the lower surface of the separator as viewed in the direction of a virtual center axis.

Details of the shape of the lower surface S2 of the separator 52 will be described. FIG. 8 is the bottom view of the lower surface S2 of the separator 52 as viewed in the direction of the virtual center axis va. As shown in FIG. 8, the lower surface S2 of the separator 52 according to the present embodiment has an inner portion 61 and an annular portion 62. The inner portion 61 has a circular shape centered at the virtual center axis va as viewed in the direction of the virtual center axis va. Further, as shown in FIG. 5, the inner portion 61 has an arc shape with the center portion as the lower end as viewed in the direction orthogonally intersecting with the virtual center axis va.

On the other hand, as shown in FIG. 8, the annular portion 62 has a substantially annular shape surrounding the inner portion 61 and including the outer peripheral end portion of the lower surface S2 as viewed in the direction of the virtual center axis va. Further, as shown in FIG. 5, the annular portion 62 is inclined outwardly and upwardly from each of the both end portions (the outer peripheral end portions) of the inner portion 61 to the lower end of the outer peripheral surface S3 as viewed in the direction that orthogonally intersects with the virtual center axis va.

Figure 9:
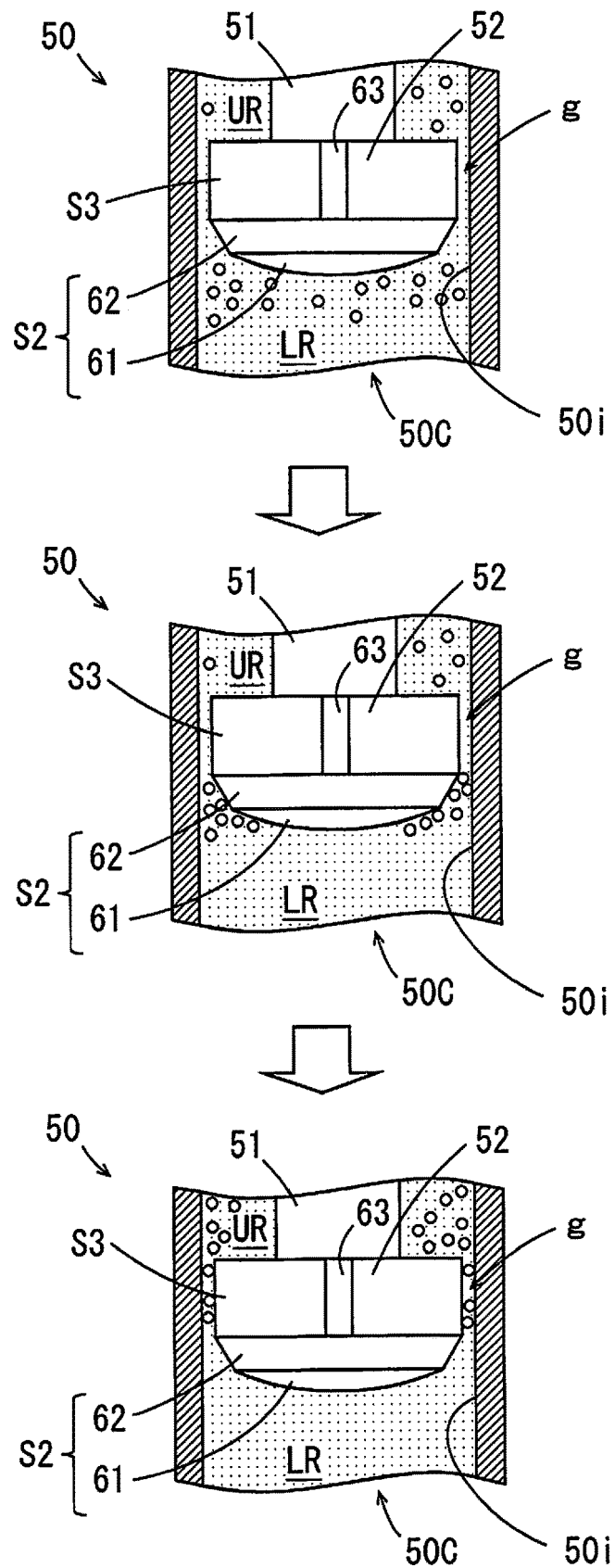
FIG. 9 is a diagram for explaining the effect of a master cylinder according to one embodiment of the present invention.

[4] Effects (1) FIG. 9 is a diagram for explaining the effects of the master cylinder 30 according to the one embodiment. In the master cylinder 30 according to the present embodiment, the inner space of the storage chamber 50C of the reservoir tank 50 is sectioned into the upper region UR and the lower region LR by the separator 52. In this state, the liquid surface of the hydraulic fluid stored in the reservoir tank 50 is located in the upper region UR.

As shown in the upper field of FIG. 9, when the liquid surface of the hydraulic fluid changes largely due to vibration, bubbles generated in the upper region UR may enter the lower region LR through the gap g between the outer peripheral surface S3 of the separator 52 and the inner peripheral surface 50i of the reservoir tank 50.

As such, in the separator 52 according to the present embodiment, the annular portion 62 of the lower surface S2 is formed to be inclined outwardly and upwardly. Thus, as shown in the middle field of FIG. 9, even in a case in which bubbles enter the lower region LR, the entered bubbles are guided smoothly to the gap g between the outer peripheral surface S3 and the inner peripheral surface 50i along the annular portion 62 of the separator 52. Further, the bubbles guided to the gap g are guided smoothly to the upper region UR through the gap g. Therefore, bubbles that enter the lower region LR are prevented from remaining in the lower region LR for a long period of time. Thus, regardless of the state of vibration generated during traveling of the vehicle, an amount of bubbles present in the lower region LR of the reservoir tank 50 can be reduced. Therefore, credibility in regard to prevention of bubbles from entering the hydraulic pressure chamber 40C of the cylinder main body 40 is improved.

(2) In the storage chamber 50C of the reservoir tank 50, the gap g between the outer peripheral surface S3 of the separator 52 and the inner peripheral surface 50i functions as a hydraulic flow passage that enables circulation of the hydraulic fluid between the upper region UR and the lower region LR. This gap g further reduces entrance of bubbles generated in the upper region UR to the lower region LR. Therefore, it is desirable that the outer diameter of the outer peripheral surface S3 and the inner diameter of the inner peripheral surface 50i are defined to further reduce circulation of bubbles while allowing circulation of the hydraulic fluid between the upper region UR and the lower region LR.

(3) As shown in FIG. 5, in the direction of the virtual center axis va, the length D1 of the outer peripheral surface S3 of the separator 52 is larger than the length D2 of the annular portion 62 of the lower surface S2 of the separator 52. In this case, the length of the gap g that functions as a hydraulic flow passage can be increased as compared to a case in which the length D1 of the outer peripheral surface S3 is equal to or smaller than the length D2 of the annular portion 62 in the direction of the virtual center axis va. Thus, with a simple configuration, entrance of bubbles generated in the upper region UR to the lower region LR can be more sufficiently suppressed.

(4) The length D1 of the outer peripheral surface S3 of the separator 52 in the direction of the virtual center axis va has a dimension of not less than ⅓ of the diameter of the outer peripheral surface S3. Further, it is desirable that the length D1 has a larger dimension in a case in which the length D1 has a dimension of not less than ⅓ of the diameter of the outer peripheral surface S3. In this case, the length of the hydraulic flow passage (the gap g in the present example) can be increased as compared to a case in which the length D1 of the outer peripheral surface S3 of the separator 52 has a dimension smaller than ⅓ of the diameter of the outer peripheral surface S3. Thus, with a simple configuration, entrance of bubbles generated in the upper region UR to the lower region LR can be further suppressed.

It is desirable that the length D1 of the outer peripheral surface S3 of the separator 52 in the direction of the virtual center axis va is larger than 3 mm, for example. In this case, high rigidity of the separator 52 is ensured. Therefore, deformation of the separator 52 suppresses entrance of a large amount of bubbles from the upper region UR to the lower region LR.

(5) In the above-mentioned separator 52, the groove 63 is formed in part of the outer peripheral surface S3. With this configuration, even in a case in which the hydraulic fluid does not circulate between the upper region UR and the lower region LR after bubbles enter the lower region LR, the bubbles that have entered the lower region LR are guided smoothly to the upper region UR through the gap portion of the gap g between the groove 63 and the inner peripheral surface 50i. Thus, because bubbles are prevented from remaining in the lower region LR for a long period of time, an amount of bubbles present in the lower region LR of the reservoir tank 50 can be further reduced.

(6) The separator 52 is formed of a solid material. In this case, rigidity of the separator 52 can be enhanced as compared to a case in which the separator 52 is formed of a hollow material. Therefore, in a case in which the hydraulic fluid circulates between the upper region UR and the lower region LR, the separator 52 is prevented from being deformed due to the circulation. As a result, entrance of a large amount of bubbles from the upper region UR to the lower region LR due to the deformation of the separator 52 is suppressed.

(7) In the above-mentioned separator 52, the inner portion 61 of the lower surface S2 has a shape that bulges downwardly such that the center portion serves as the lower end portion. With such a configuration, also in the inner portion 61, bubbles are guided smoothly from the center portion to the annular portion 62. Further, even in a case in which the separator 52 is formed by injection molding, a depression caused by sink marks is unlikely to be generated in the inner portion 61 of the lower surface S2. Thus, bubbles that enter the lower region LR in the reservoir tank 50 do not remain on the inner portion 61.

[5] Modified Example of Lower Surface S2 of Separator 52

Figure 10:
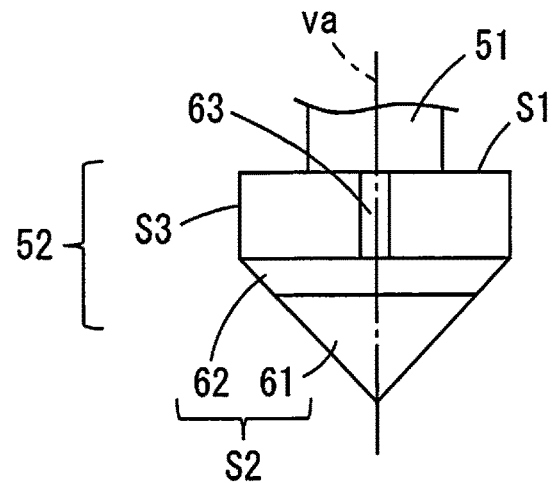
FIG. 10 is a side view of a lower surface of a separator according to a first modified example.

The lower surface S2 of the separator 52 is not limited to the example of FIG. 5 and may have the below-mentioned configuration. FIG. 10 is a side view of a lower surface S2 of a separator 52 according to a first modified example. In the first modified example, the entire lower surface S2 has an inverted cone shape. Also in the present example, an annular portion 62 is inclined outwardly and upwardly from each of the both end portions (the outer peripheral end portions) of an inner portion 61 to the lower end portion of an outer peripheral surface S3 as viewed in a direction that orthogonally intersects with a virtual center axis va. Thus, the similar effect to that of the example of FIG. 5 can be obtained.

Figure 11:
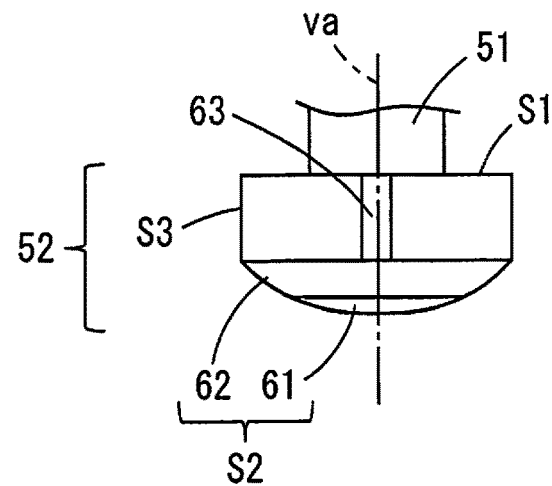
FIG. 11 is a side view of a lower surface of a separator according to a second modified example.

FIG. 11 is a side view of a lower surface S2 of a separator 52 according to a second modified example. In the second modified example, the entire lower surface S2 forms part of a spherical surface. Also in the present example, an annular portion 62 is inclined outwardly and upwardly from each of the both end portions (the outer peripheral end portions) of an inner portion 61 to the lower end portion of an outer peripheral surface S3 as viewed in a direction that orthogonally intersects with a virtual center axis va. Thus, the similar effect to that of the example of FIG. 5 can be obtained. As shown in the present modified example, the annular portion 62 of the lower surface S2 may be curved in a side view.

Figure 12:
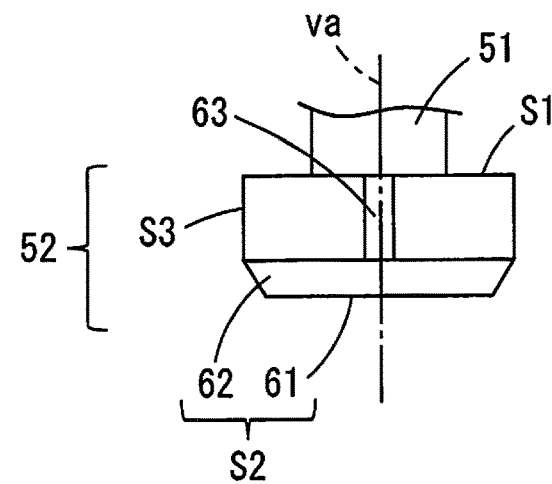
FIG. 12 is a side view of a lower surface of a separator according to a third modified example.

FIG. 12 is a side view of a lower surface S2 of a separator 52 according to a third modified example. In the third modified example, an inner portion 61 of a lower surface S2 has a flat-plate shape. Also in the present example, an annular portion 62 is inclined outwardly and upwardly from each of the both end portions (the outer peripheral end portions) of an inner portion 61 to the lower end portion of an outer peripheral surface S3 as viewed in a direction that orthogonally intersects with a virtual center axis va. Thus, the similar effect to that of the example of FIG. 5 can be obtained.

In the lower surface S2 of the separator 52, a level difference may be generated in the inner portion 61. Further, in the lower surface S2 of the separator 52, only one portion of the entire annular portion 62 may be inclined outwardly and upwardly from the outer peripheral end portion of the inner portion 61 to the lower end portion of the outer peripheral surface S3.

[6] Other Embodiments (1) The separator 52 according to the above-mentioned embodiment may be formed of a hollow material instead of a solid material. In this case, the weight of the separator 52 can be reduced.

(2) While the groove 63 is formed in the outer peripheral surface S3 in the separator 52 according to the above-mentioned embodiment, the present invention is not limited to this. The groove 63 does not have to be formed in the outer peripheral surface S3. In this case, the separator 52 can be fabricated easily.

(3) While the separator 52 and the diaphragm 51 according to the above-mentioned embodiment are constituted by a single member integrally formed of a common material, the present invention is not limited to this. The separator 52 and the diaphragm 51 may be fabricated individually. In this case, the separator 52 and the diaphragm 51 may be provided in the reservoir tank 50 while being joined to each other or may be provided in the reservoir tank 50 while being separated from each other.

(4) In the motorcycle 100 according to the above-mentioned embodiment, the master cylinder 30 is fixed to the body frame 1 such that the reservoir direction is substantially vertical to the road surface when the vehicle is traveling straight ahead. However, the present invention is not limited to this. The master cylinder 30 may be fixed to the body frame 1 such that the reservoir direction is inclined with respect to the road surface by a predetermined angle when the vehicle is traveling straight ahead. In this case, it is desirable that the groove 63 formed in the separator 52 is located in an upper portion of the outer peripheral surface S3. The groove 63 is formed in the upper portion of the outer peripheral surface S3, so that bubbles that have entered the lower region LR are guided smoothly to the gap portion of the gap g between the groove 63 and the inner peripheral surface 50i.

(5) The separator 52 according to the above-mentioned embodiment has a substantially circular outer shape as viewed in the direction of the virtual center axis va, the present invention is not limited to this. While the length D1 of the outer peripheral surface S3 of the separator 52 in the direction of the virtual center axis va is constant in the entire circumference of the separator 52, the present invention is not limited to this.

The separator 52 may have a substantially oval outer shape as viewed in the direction of the virtual center axis va, or may have a substantially polygonal outer shape as viewed in the direction of the virtual center axis va. Further, the length D1 of the outer peripheral surface S3 of the separator 52 in the direction of the virtual center axis va may differ in a plurality of portions located in the circumferential direction of the separator 52.

In these cases, it is desirable that the minimum length D1 of the outer peripheral surface S3 of the separator 52 in the direction of the virtual center axis va has a dimension of not less than ⅓ of the maximum dimension of the separator 52 in the direction that orthogonally intersects with the virtual center axis va. Thus, with a simple configuration, entrance of bubbles generated in the upper region UR to the lower region LR can be reduced.

In a case in which the separator 52 has a substantially rectangular outer shape as viewed in the direction of the virtual center axis va, the maximum dimension of the separator 52 in the direction that orthogonally intersects with the virtual center axis va is the length of one diagonal out of the two diagonals of the rectangular outer shape.

(6) While the above-mentioned embodiment is an example in which the present invention is applied to a brake master cylinder of a motorcycle, the present invention is not limited to this. The present invention may be applied to a brake master cylinder of another straddled vehicle such as a four-wheeled automobile, a motor tricycle or an ATV (All Terrain Vehicle).

[7] Correspondences Between Constituent Elements in Claims and Parts in Preferred Embodiments In the following paragraphs, non-limiting examples of correspondences between various elements recited in the claims below and those described above with respect to various preferred embodiments of the present invention are explained. In the above-mentioned embodiment, the hydraulic pressure chamber 40C is an example of a hydraulic pressure chamber, the cylinder main body 40 is an example of a cylinder main body, the storage chamber 50C is an example of a storage chamber, the reservoir tank 50 is an example of a reservoir tank, the upper region UR is an example of an upper region, and the lower region LR is an example of a lower region.

Further, the separator 52 is an example of a separator, the lower surface S2 of the separator 52 is an example of a lower surface, the annular portion 62 of the lower surface S2 is an example of an annular portion, the portion that is inclined outwardly and upwardly of the annular portion 62 of the lower surface S2 is an inclined portion, and the master cylinder 30 is an example of a master cylinder.

Further, the inner peripheral surface 50i of the reservoir tank 50 is an example of an inner peripheral surface, the outer peripheral surface S3 of the separator 52 is an example of an outer peripheral surface, the gap g between the outer peripheral surface S3 of the separator 52 and the inner peripheral surface 50i of the reservoir tank 50 is an example of a hydraulic flow passage, the groove 63 of the separator 52 is an example of a groove, the configuration including the body frame 1, the engine 5, the rear arm 6, the fuel tank 8, the seat 9 and so on is an example of a vehicle main body, the rear wheel 7 is an example of a wheel, the brake caliper 72 is an example of a caliper, and the motorcycle 100 is an example of a straddled vehicle.

As each of constituent elements recited in the claims, various other constituent elements having configurations or functions described in the claims can be also used.

[8] Reference Embodiment

In the above-mentioned master cylinder 30, the larger the length D1 of the outer peripheral surface S3 of the separator 52 in the direction of the virtual center axis va is, the smaller the amount of bubbles that enter the lower region LR from the upper region UR can be. Therefore, in a case in which the length D1 of the outer peripheral surface S3 of the separator 52 is set to the size that hardly allows bubbles to enter the lower region LR from the upper region UR, the annular portion 62 (the inclined portion in the present invention) that is inclined with respect to the lower surface S2 of the separator 52 does not have to be provided.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A master cylinder for a brake, comprising:
a cylinder main body having a hydraulic pressure chamber configured to store a hydraulic fluid;
a reservoir tank having a storage chamber configured to store the hydraulic fluid for replenishing the hydraulic pressure chamber; and
a separator that is provided in the reservoir tank to divide a space in the storage chamber of the reservoir tank into an upper region and a lower region, such that the hydraulic fluid is circulatable between the upper region and the lower region, with a liquid surface of the hydraulic fluid being in the upper region, wherein
the separator has:
an upper surface that is flat, the space in the storage chamber of the reservoir tank above the upper surface being the upper region; and
a lower surface having:
an inner portion, and
an inclined portion that surrounds the inner portion, without overlapping the inner portion in the axial direction of the separator, and that is inclined outwardly and upwardly with respect to the inner portion,
the space in the storage chamber of the reservoir tank below the lower surface being the lower region;
the reservoir tank has an inner peripheral surface that surrounds the space in the storage chamber and extends linearly from the lower region toward the upper region in a first direction, and
the separator has an outer peripheral surface that extends linearly in parallel to the inner peripheral surface of the reservoir tank, to thereby form a hydraulic flow passage between the inner peripheral surface of the reservoir tank and the outer peripheral surface of the separator, so as to enable the circulation of the hydraulic fluid between the upper region and the lower region and suppress circulation of bubbles.

2. The master cylinder according to claim 1, wherein a length of the outer peripheral surface of the separator is larger than a length of the inclined portion of the lower surface of the separator in the first direction.

3. The brake master cylinder according to claim 1, wherein
the inclined portion of the lower surface of the separator is formed to be inclined outwardly and upwardly in an entire circumference of the lower surface, and extend to join the outer peripheral surface.

4. The master cylinder according to claim 1, wherein a minimum length of the outer peripheral surface of the separator in the first direction is equal to or larger than ⅓ of a maximum dimension of the separator in a second direction that is orthogonal to the first direction.

5. A master cylinder for a brake, comprising:
a cylinder main body having a hydraulic pressure chamber configured to store a hydraulic fluid;
a reservoir tank having a storage chamber configured to store the hydraulic fluid for replenishing the hydraulic pressure chamber; and
a separator that is provided in the reservoir tank to divide a space in the storage chamber of the reservoir tank into an upper region and a lower region, such that the hydraulic fluid is circulatable between the upper region and the lower region, with a liquid surface of the hydraulic fluid being in the upper region, wherein
the separator has a lower surface in the lower region, the lower surface having
an inner portion, and
an inclined portion that surrounds the inner portion, without overlapping the inner portion in an axial direction of the separator, and that is inclined outwardly and upwardly with respect to the inner portion;

the reservoir tank has an inner peripheral surface that surrounds the space in the storage chamber and extends linearly from the lower region toward the upper region in a first direction;

the separator has an outer peripheral surface that extends linearly in parallel to the inner peripheral surface of the reservoir tank, to thereby form a hydraulic flow passage between the inner peripheral surface of the reservoir tank and the outer peripheral surface of the separator, so as to enable the circulation of the hydraulic fluid between the upper region and the lower region and suppress circulation of bubbles; and the hydraulic flow passage includes a groove that extends in the first direction and is formed in the outer peripheral surface of the separator.

6. A master cylinder for a brake, comprising:

a cylinder main body having a hydraulic pressure chamber configured to store a hydraulic fluid;

a reservoir tank having a storage chamber configured to store the hydraulic fluid for replenishing the hydraulic pressure chamber; and a separator that is provided in the reservoir tank to divide a space in the storage chamber of the reservoir tank into an upper region and a lower region, such that the hydraulic fluid is circulatable between the upper region and the lower region, with a liquid surface of the hydraulic fluid being in the upper region, wherein the separator has a lower surface in the lower region, the lower surface having
an inner portion, and
an inclined portion that surrounds the inner portion, without overlapping the inner portion in an axial direction of the separator, and that is inclined outwardly and upwardly with respect to the inner portion; and the separator is formed to be free of any internal cavity.

7. A straddled vehicle comprising:
a vehicle main body;
a wheel rotatably provided at the vehicle main body;
a caliper that supplies a braking force to the wheel; and
the master cylinder according to claim 1 connected to the caliper.

8. A master cylinder for a brake, comprising:

a cylinder main body having a hydraulic pressure chamber configured to store a hydraulic fluid;

a reservoir tank having a storage chamber configured to store the hydraulic fluid for replenishing the hydraulic pressure chamber; and a separator that is provided in the reservoir tank to divide a space in the storage chamber of the reservoir tank into an upper region and a lower region, such that the hydraulic fluid is circulatable between the upper region and the lower region, with a liquid surface of the hydraulic fluid being in the upper region, wherein the separator has:
an upper surface that is flat, the space in the storage chamber of the reservoir tank above the upper surface being the upper region; and
a lower surface having:
an inner portion, and
an inclined portion that surrounds the inner portion, without overlapping the inner portion in the axial direction of the separator, and that is inclined outwardly and upwardly with respect to the inner portion, the space in the storage chamber of the reservoir tank below the lower surface being the lower region; and the separator further has an outer peripheral surface connecting the upper surface and the inclined portion of the lower surface, the outer peripheral surface extending linearly in parallel to the axial direction of the separator.

* * * * *